Feb. 22, 1938.   D. D. WILE   2,108,979
VALVE
Filed July 9, 1935
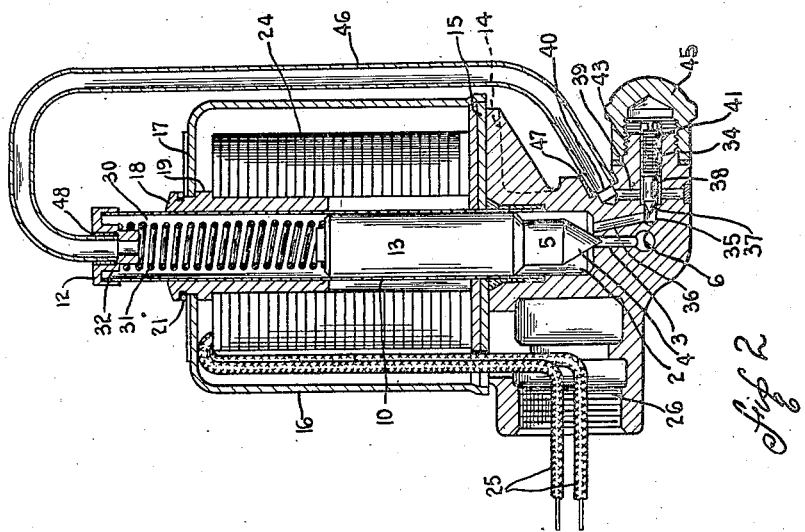
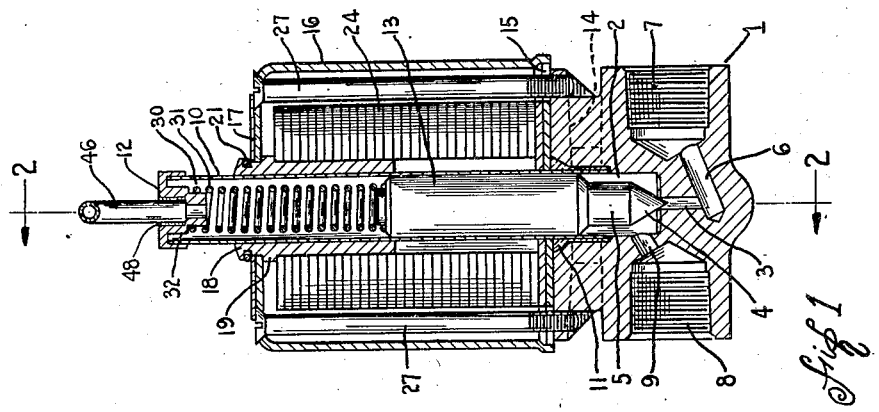
INVENTOR
Daniel D. Wile
BY
his ATTORNEY Patented Feb. 22, 1938

2,108,979

UNITED STATES PATENT OFFICE 2,108,979

VALVE

Daniel D. Wile, Detroit, Mich., assignor to Detroit Lubricator Company, Detroit, Mich., a corporation of Michigan Application July 9, 1935, Serial No. 30,439

6 Claims. (Cl. 137—139)

My invention relates generally to valves, and more particularly to valves for controlling flow of fluid through a fluid conveying line.

One of the objects of my invention is to provide a valve for controlling the flow of fluid through a fluid conveying line and to provide for dampening movement of the valve upon actuation of the same by utilizing the fluid passing through the valve in a new and novel manner as the dampening medium.

Another object of my invention is to provide an electrically operated valve having new and improved means for retarding movement of the valve to prevent slamming of the valve upon energization of the electrically operated means.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated a preferred embodiment of my invention, in which drawing—

Figure 1 is a view in longitudinal cross section of my new and improved valve, and Fig. 2 is a view in longitudinal cross section taken along the line 2—2 of Fig. 1.

Referring now to the drawing by characters of reference, the numeral 1 designates a valve body or casing having a valve controlled passage therethrough which includes a valve chamber 2. The valve chamber 2 is preferably a central bore terminating at a point in the body, at which point a relatively smaller and concentric bore 3 provides a seat for cooperating with the conical face 4 of a valve 5 disposed for operation in chamber 2. In communication with bore 3 is a passage or bore 6 which leads into a relatively larger bore 7 which constitutes the outlet and which is internally threaded for threaded connection to a conduit or liquid conveying pipe line (not shown). Oppositely disposed to the outlet bore 7 is a similar bore 8 which leads into the body and constitutes the inlet, and the inlet 8 may communicate with the valve chamber 2 through a passage or bore 9. The bore 8 is also internally threaded for threaded connection to a conduit or liquid conveying pipe line.

The valve chamber 2 is preferably cylindrical and opens upwardly through the top wall of the body 1. The upper end portion of the chamber 2 is of slightly enlarged internal diameter to receive the lower end of a sleeve or tubular guide member 10 which extends upwardly from the top wall of the body. The tubular member 10 is secured and sealed in the body by solder, or other suitable means, as at 11, and is closed at its upper end by a cap member 12. Within the sleeve guide member 10 and longitudinally reciprocal therein, there is an armature or core member 13 rigid with the valve member 5 which extends downward from the lower end thereof. Preferably the core 13 is cylindrical in shape and has a slidable fit with the tubular member 10. The upper end of the body 1 is provided with a substantially horizontal supporting flange 14 which surrounds the tubular member 10. Supported on the flange 14 is a circular, centrally apertured plate 15 through which the tubular sleeve 10 projects and which serves to close the bottom end of a substantially cylindrical housing or cover member 16 having a top wall 17. Extending downward from the top wall 17 and into the housing 16 is a sleeve 18 through which the upper end portion of the tubular member 10 projects. The sleeve 18 surrounds the tubular member 10 and extends through an aperture in the top wall 17 of the casing 16 and has a flange 19 which abuts the under side of the top wall 17. The sleeve member 18 is secured to the housing 16 by a resilient ring member 21 seating in a circumferential groove in the sleeve member 18 and bearing against the outer surface of the top wall 17.

Within the housing 16 and surrounding the sleeve 18 and the tubular member 10, there is a solenoid coil 24 which rests on the plate member 15 and is provided with lead wires 25 connected to the terminals of the coil. The wires 25 extend downward through apertures in the plate member 15 into an outlet boss or fitting 26 preferably formed integral with the body 1. The housing 16 and the coil 24 are secured to the casing 1 by screws 27 extending through the top wall 17 and the plate member 15 and screw-threaded into internally threaded apertures in the flange 14.

Within the upper end of the tubular member 10, between the upper end of the core 13 and the cap 12, is a variable capacity chamber 30. A coil spring 31 is disposed within the chamber 30 with one end bearing against the upper end of the core 13 and surrounding a projecting portion on the core provided to maintain the end of the spring in proper position. The other end of the spring 31 bears against the underside of the cap member 12 which is formed on its underside with a tubular protuberance 32 which the adjacent end of the spring surrounds and is held in proper position thereby. The spring 31 serves as a dampening means opposing quick upward movement of the valve and as the valve moves upward, the spring 31 is compressed, and during the time period that the solenoid coil 24 is energized the spring is held under compression. Upon deenergization of the solenoid coil 24, the stored energy in the compressed spring acts to urge the valve toward its seat.

In the lower end of the body 1 and preferably below the valve chamber 2 there is provided a two-diameter bore, the larger bore 34 of which leads out of the body and the smaller bore 35 of which terminates within the body. The two-diameter bore extends, in the present instance, transverse to the valve chamber 2 and is in communication therewith by a connecting passage or bore 36 which leads downwardly into the smaller bore 35 of the two-diameter bore. The shoulder formed between the two bores 34 and 35 provides a valve seat for cooperating with the conical face 37 of a needle valve 38 disposed in bore 34 for controlling flow of liquid through the valve seat port. A bore 39 is provided in the body 1 and, in the present instance, extends upwardly, intersecting the larger bore 34, preferably adjacent the valve seat and intersects another bore 40, which latter bore leads out of the body 1. The larger bore 34 is internally threaded for receiving the valve 38 which has an enlarged diameter portion 41 which is externally threaded for threading into the bore 34. By rotating the valve in one direction, it may be advanced to seat and close the valve port or by rotating it in the opposite direction, it may be moved away from its seat to open the port. The valve may be provided with a slot in its outer end, as shown, for receiving a tool such as a screw-driver for rotating the valve. The outer end portion of the body wall surrounding the valve 38 is preferably formed cylindrical in shape, as at 43, and is exteriorly threaded to receive an internally threaded hollow cap or cover member 45.

Connecting the valve chamber 2 and the variable capacity chamber 30 above or on the other side of the valve 5 is a by-pass means in the form of a conduit or pipe 46. One end of the conduit 46 may be inserted into the bore 40 and may be sealed and secured therein such as by means of solder 47 disposed in a circular groove surrounding the outer wall of the conduit 46. The other end of the conduit is inserted in an aperture preferably in the top of the cap member 12 and may be sealed and secured therein such as by solder, indicated at 48. The cap 12 is apertured, in the present instance, with a two-diameter bore providing communication between the conduit 46 and the interior of the chamber 30. The inner end of the conduit abuts or bears against the shoulder formed by the two-diameter bore.

The operation of the device is as follows: The needle valve 38 is adjusted relative to its seat so that liquid flowing through the device will pass from chamber 2 through the connecting passages and through the valve port controlled by the needle valve 38 and through the conduit 46 into the variable capacity chamber 30. The liquid is forced through the conduit 46 into the variable capacity chamber 30 above the end of the core 13 by the pressure of the liquid in the line and the chamber 30 is filled so that upon displacement of the liquid in chamber 30 by the core 13, the force exerted by the core is transmitted through the body of liquid in the conduit 46 which forces liquid past the needle valve and into chamber 2. When the solenoid coil 24 is energized, the core 13 and integral valve are raised, thus opening the valve port to permit flow of the liquid through the device. As the core 13 rises, it is retarded in its movement by the spring 31 and the liquid in chamber 30, some of which liquid is displaced thus forcing liquid past the valve 38 into chamber 2. When the valve 5 is in open position, the pressure of the liquid in chamber 2 acting against the valve tending to move the same upward and the force exerted by the liquid acting in chamber 30 to close the valve are equal in magnitude. When the solenoid coil 24 is deenergized, the core and integral valve 5 descends by gravity aided by the spring 31 to close the valve port. In order to descend and seat, some of the liquid in chamber 2 must be displaced by the valve and discharged past the needle valve 38 into the conduit 46 from where liquid is forced into the chamber 30 which is increasing in capacity as the core 13 descends. By adjusting the position of the manually operated needle valve 38, relative to its seat to increase or decrease the size of the orifice therethrough, the rate of flow of fluid therethrough may be varied as desired to increase or decrease the speed of operation of the valve 5.

From the foregoing description it will now be seen that I have provided a new and improved valve structure for controlling liquid flow in a liquid conveying line and one which has provision for utilizing the liquid flowing therethrough as a dampening medium to retard movement of the valve. By providing for dampening the valve, the valve may be electrically operated without resultant slamming of the valve upon energization or deenergization of the electrically operated means. In addition, I have provided for adjusting the retarding force opposing operation of the valve so that the operating speed of the valve may be regulated.

What I claim and desire to secure by Letters Patent of the United States is:

1. A device of the character described, comprising a body having inlet and outlet ports, a valve in said body for controlling flow of a fluid passing through the body from the inlet to the outlet port, said fluid passing from the inlet to the outlet exerting a force against the valve to retard movement of the valve in one direction, means for moving said valve in the opposite direction, duct means in open communication with said inlet for conveying the fluid to the other side of the valve to exert a force thereagainst whereby to retard movement of said valve in the opposite direction, and yieldable means acting to move said valve in one of said directions.

2. A device of the character described, comprising a body having inlet and outlet ports and having a valve housing, a valve in said housing for controlling flow of a fluid therethrough, said valve cooperating with the valve housing providing a chamber on one side of the valve communicating with said inlet and outlet ports and a second and closed chamber on the other side of the valve, means for moving said valve to an open position, by-pass means leading from said first-named chamber to said second-named chamber and through which the fluid flows back and forth upon actuation of said valve whereby the fluid exerting its force on opposite sides of the valve retards movement thereof, means for regulating the rate of flow of fluid through said by-pass means, said by-pass means being at all times in open communication with said inlet, and spring means opposing said first-named means and acting to move said valve toward closed position.

3. In a valve for controlling flow of liquid, a casing having a valve chamber and a valve port having a seat and opening into said valve chamber, a reciprocal valve member in said chamber and cooperable with said port to control flow through said casing, said valve member dividing said chamber into a variable capacity chamber communicating with said port at one end of said valve member and a second variable capacity chamber at the opposite end of said valve member, said casing having an inlet in open communication with said first-named chamber, and duct means connecting said variable capacity chambers for the passage of liquid back and forth therebetween under the action of said valve member to retard movement of said valve member, said valve member when seated closing said port to flow therethrough, said second-named chamber being in open communication with said inlet irrespective of the position of said valve member, and spring means acting to move said valve member to close said port.

4. In a valve for controlling flow of liquid, a body portion having a cylindrical recess in its top wall and having inlet and outlet ports opening into said recess, a tubular member having an end portion fitting into said cylindrical recess and extending upwardly from said top wall, said tubular member having a closed upper end and cooperating with said recess to provide a valve chamber, a reciprocal valve member in said chamber and longitudinally slidable in said tubular member, said valve member being operable to control flow of liquid from said inlet to said outlet and having an upper end portion constituting an armature, an electrically energizable coil surrounding said tubular member and the armature therein for actuating said valve member, and duct means communicating with said valve chamber above and below said valve member to provide a by-pass for liquid for retarding movement of said valve member, said by-pass being in open communication with said inlet irrespective of the operation of said valve member.

5. In a valve for controlling flow of liquid, a body portion having a cylindrical recess in its top wall and having an inlet and an outlet opening into said recess, a tubular member having an end portion fitting into said recess and extending upwardly from said top wall, said tubular member having a closed upper end and cooperating with said recess to provide a valve chamber, a reciprocal valve member in said chamber and longitudinally slidable in said tubular member, said valve member having an upper end portion constituting an armature, an electrically energizable coil mounted on said top wall and surrounding said tubular member and said armature, said coil being energizable to actuate said valve member, a passage connecting said recess below said valve member and connecting said tubular member above said valve member such that the recess above said valve member is always in open communication with said inlet, said passage providing a by-pass for the passage of liquid back and forth between the opposite ends of said chamber to retard movement of said valve member, said valve member being raised upon energization of said coil to permit flow of liquid from said inlet to said outlet, said valve member seating by gravity upon deenergization of said coil, and a coil spring in said tubular member having one end in abutment with said valve member and the other end in abutment with the upper end wall of said tubular member, said spring and the liquid above said valve member acting to move said valve member to expel liquid from said recess to aid seating of said valve member.

6. In a valve for controlling flow of liquid, a body portion having a chamber opening through a wall thereof and having an inlet and an outlet for said chamber, a tubular member having an open end fitting into said chamber, said tubular member closing said chamber and projecting from said wall externally of said body portion, a reciprocal valve member controlling flow through said chamber, said valve member being disposed in and having a sliding fit with the wall of said tubular member, an electrically energizable coil surrounding said valve member and operable on energization to move said valve member, said valve member cooperating with said tubular member to provide a chamber at one end of said valve member, duct means connecting said first-named chamber and said second-named chamber, said duct means connecting to said first-named chamber on the inlet side thereof and providing a by-pass for flow of liquid back and forth between said chambers under the action of said valve member to retard movement of the same.

DANIEL D. WILE.